United States Patent [19]

Owen et al.

[11] 4,102,693

[45] Jul. 25, 1978

[54] PHOTOCHROMIC BORO-SILICATE GLASS

[75] Inventors: Harry Owen, Parbold; Thomas Barrow, Ormskirk, both of England

[73] Assignee: Pilkington Brothers Limited, Merseyside, England

[21] Appl. No.: 764,315

[22] Filed: Jan. 31, 1977

[30] Foreign Application Priority Data

Jan. 30, 1976 [GB] United Kingdom ............... 3785/76

[51] Int. Cl.² .......................... C03C 3/10; C03C 3/08; C03C 3/26
[52] U.S. Cl. ................................. 106/54; 106/47 Q; 106/53
[58] Field of Search ............. 106/DIG. 6, 53, 54

[56] References Cited

U.S. PATENT DOCUMENTS

| 3,197,296 | 7/1965 | Eppler et al. ............... 106/DIG. 6 |
| 3,208,860 | 9/1965 | Armistead et al. .......... 106/DIG. 6 |
| 3,795,523 | 3/1974 | Moriya et al. .............. 106/DIG. 6 |

*Primary Examiner*—Winston A. Douglas
*Assistant Examiner*—Mark Bell

*Attorney, Agent, or Firm*—Sughrue, Rothwell, Mion, Zinn and Macpeak

[57] ABSTRACT

Fast-response photochromic boro-silicate glasses which have silver halide crystals dispersed throughout the glass and are free from barium, comprise, in weight percentages:

| $SiO_2$ | 31 to 59% |
| $B_2O_3$ | 18 to 28% |
| $Al_2O_3$ | 8 to 20% |
| $R_2O$ | 6 to 16% | where $R_2O$ represents one or more of $Li_2O$, $Na_2O$ and $K_2O$ in amounts within the ranges 0 to 3% $Li_2O$, 0 to 8% $Na_2O$ and 0 to 16% $K_2O$, and where the content of silver, expressed as $Ag_2O$, lies within the range 0.05 to 0.4% by weight, while the content of halide lies within the range 0.13 to 1% by weight of the glass.

Further optional constituents are MgO (up to 2.6%) and $P_2O_5$ (up to 12%). Refractive index $n_D$ can be corrected to the standard ophthalmic value of 1.523 by additions of $ZrO_2$, $TiO_2$ and/or PbO.

4 Claims, No Drawings

PHOTOCHROMIC BORO-SILICATE GLASS

BACKGROUND OF THE INVENTION

1. Field of the Invention

This invention relates to photochromic glasses, i.e. to glass compositions which darken on exposure to actinic radiation and fade back to their original, normally colourless, state when no longer exposed.

2. Description of the Prior Art

Photochromic boro-silicate glasses have been previously described, e.g. in U.S. Pat. No. 3,208,860 (Armistead and Stockey), and are available on the market. These glasses, while exhibiting desirable photochromic properties, have relatively slow responses to exposure to, and removal of, actinic radiation, i.e. slow darkening and fading rates. It is desirable, particularly for ophthalmic purposes, to have glasses with faster responses, particularly a faster fading rate. A rapid fading rate is desirable to aid in adjusting to a sudden decrease in available light, as when a wearer of spectacles with lenses of photochromic glass enters a dimly-lit room.

SUMMARY OF THE INVENTION

An object of the present invention is to provide a range of photochromic boro-silicate glasses having improved properties and, in particular, which provide an improved combination of photochromic effect, measured as the induced optical density or change in the light transmission when irradiated with actinic radiation, and speed of response to irradiation or removal of radiation.

According to the present invention, a photochromic boro-silicate glass which has silver halide crystals dispersed throughout the glass, is free from barium and comprises, in weight percentages:

| | |
|---|---|
| $SiO_2$ | 31 to 59% |
| $B_2O_3$ | 18 to 28% |
| $Al_2O_3$ | 8 to 20% |
| $R_2O$ | 6 to 16% | where $R_2O$ represents one or more of $Li_2O$, $Na_2O$ and $K_2O$ in amounts within the ranges 0 to 3% $Li_2O$, 0 to 8% $Na_2O$ and 0 to 16% $K_2O$, and where the content of silver, expressed as $Ag_2O$, lies within the range 0.05 to 0.4% by weight while the content of halide lies within the range 0.13 to 1% by weight of the glass.

A good combination of induced optical density on irradiation with actinic light, and rapid darkening and fading rates on initiation and cessation of irradiation, can be obtained with such glasses. It will be understood that, as a general rule, darkening and fading times are longer when the induced optical density is greater.

Preferably the glass further comprises MgO in an amount of up to 2.6% by weight of the glass.

Some useful glasses within the scope of the invention further comprise $P_2O_5$ in an amount of up to 12% by weight of the glass.

For ophthalmic use, it is convenient for the glass to have a refractive index ($n_D$), measured for light of the wavelength of the sodium D line, which is as close as possible to the standard figure of 1.523. To adjust the refractive index to this figure, addition of proportions of $ZrO_2$, $TiO_2$ and/or PbO can be of value, though care is needed to avoid problems arising from too large a quantity of one or more of these components. The amount of $ZrO_2$ should preferably not exceed 7% by weight of the glass, to avoid unacceptable increases in liquidus temperature. The amount of $TiO_2$ should not exceed 5% by weight of the glass, to avoid dangers of crystallisation and unwanted colouration of the glass. PbO can be incorporated in quantities up to 7% by weight of the glass. Minor amounts of other additives may be incorporated. For example, tinting agents may be incorporated in known manner, to provide a permanent tint in addition to the variable photochromic colouring of the glass.

As is known, the photochromic effect is produced by the silver halide crystals referred to above. Minor amounts of copper oxides assist the development of the photochromic effect, and larger amounts of CuO may be used to provide a permanent tinting effect as referred to above. The preferred amounts of the photochromic components, namely the silver (expressed as $Ag_2O$), the copper oxide and the halides (Cl, Br and F), which are expressed in accordance with the normal convention as quantities over and above the 100% total of all other components of the glass, are as follows:

| | |
|---|---|
| $Ag_2O$ | 0.08 to 0.39% |
| CuO | 0.004 to 1% |
| Cl | 0.04 to 0.5% |
| Br | 0 to 1.0% |
| F | 0 to 0.2% |

In most cases, the photochromic effect can be enhanced by heat treatment of the glass, the appropriate heat treatment schedule being primarily determined by the viscosity-temperature relationship of the particular glass. In general, the heat treatment temperature lies between the strain point and the softening point of the glass, the heat treatment time required being several hours at the lower temperature but only a few minutes at the higher temperature. At the higher temperature, however, deformation and clouding of the glass may occur, so it is preferred for convenience to use a temperature 20° to 100° C above the annealing point and a heat treatment time of 10 to 60 minutes.

The schedule may be imposed on the glass directly after forming or the glass may be annealed and cooled to room temperature before heat treatment. The cooling rate to which the glass is subjected after heat treatment is sometimes found to have an effect on the photochromic properties of the final product. This cannot be stated as a general rule however and must be determined by experimentation on individual glasses.

The temperature/time schedule imposed on a glass is also determined by the concentrations of photochromic agents in the glass and the photochromic property requirements of the final product. In general, the higher the levels of the components contributing to the photochromism the shorter will be the heat treatment schedule and, in some cases, the photochromism may develop during cooling from the melt or annealing of the glass. Excessively long heat treatments are generally to be avoided because they may lead to some clouding of the glass.

DETAILED DESCRIPTION OF THE INVENTION

Specific embodiments of the invention will now be described in more detail by way of example and with reference to the following table, which sets out examples of glass compositions in accordance with the invention, showing their compositions on the oxide basis and the photochromic effect achieved in terms of the induced optical density (ODd) and the time in seconds taken to fade from the darkened condition to a condition in which half of the lost light transmission has been restored, known as the half fading time (½ FT), measured with standard samples of glass 2 mm. thick in standard simulated solar conditions at air mass 2 (see Parry Moon, J. Franklin Inst, 230 (1940, pages 583-617). The induced optical density is the difference between the optical density of the glass in the fully darkened state and the optical density of the glass in the fully faded state, the optical density being defined in the conventional manner as $\log_{10}(I_i/I_t)$, where $I_i$ is the intensity of the incident light and $I_t$ is the intensity of the transmitted light. The induced optical density is thus a real measure of the photochromic effect and is in fact directly proportional to the number of photochromically activated silver atoms in a given volume of the glass. The half fading time (½ FT) measures the speed of response of the glass to removal of actinic radiation. The table also lists the temperature (HT° C) and the time of the heat treatment applied to each of the glasses. For glasses 3 to 27, a standard heat treatment time of one hour was used in each case, for comparative purposes only.

Finally the table lists the refractive index $n_D$ of each of the glasses.

| Glass No. | 1 | 2 | 3 | 4 | 5 | 6 | 7 | 8 | 9 | 10 |
|---|---|---|---|---|---|---|---|---|---|---|
| Wt% | | | | | | | | | | |
| $SiO_2$ | 53.5 | 53.8 | 53.5 | 54.7 | 53.2 | 49.0 | 54.6 | 54.6 | 54.1 | 54.6 |
| $B_2O_3$ | 25.1 | 25.3 | 22.6 | 22.4 | 23.0 | 22.6 | 22.5 | 22.6 | 22.1 | 22.4 |
| $Al_2O_3$ | 9.0 | 9.1 | 8.9 | 8.8 | 8.4 | 8.8 | 9.2 | 8.5 | 8.4 | 8.6 |
| $P_2O_5$ | | | | | | | | | | |
| MgO | | | 1.1 | 1.1 | 2.6 | 1.2 | | 1.1 | 1.2 | 1.1 |
| $Li_2O$ | | | | | | | | | | |
| $Na_2O$ | | | 0.9 | | | | | | | |
| $K_2O$ | 12.3 | 9.3 | 12.2 | 12.2 | 12.2 | 13.0 | 13.1 | 12.6 | 13.0 | 12.5 |
| PbO | | | | | | | | | | |
| $ZrO_2$ | | | | | | | | | | |
| $TiO_2$ | | | | | | .0 | | | | |
| $Ag_2O$ | .29 | .31 | .32 | .38 | .31 | .31 | .39 | .22 | .35 | .36 |
| CuO | .020 | .020 | .007 | .012 | .0075 | .009 | .0065 | .006 | .007 | .017 |
| Cl | .13 | .16 | .20 | .15 | .20 | .21 | .16 | .14 | .10 | .17 |
| Br | | | .14 | .09 | .12 | .08 | .08 | .10 | .19 | .14 |
| F | | | | | | | | | | |
| ODd | .096 | .038 | .356 | .211 | .507 | .422 | .347 | .120 | .529 | .378 |
| ½ FT (in secs) | 15 | 4 | 2.40 | 12 | 35 | 60 | 42 | 10 | 45 | 15 |
| $n_D$ | 1.484 | 1.483 | 1.495 | 1.486 | 1.486 | 1.512 | 1.484 | 1.487 | 1.487 | 1.487 |
| HT° C | 600 | 560 | 600 | 600 | 600 | 600 | 600 | 600 | 600 | 640 |
| Time (hrs) | 3 | 3 | 1 | 1 | 1 | 1 | 1 | 1 | 1 | 1 |

| Glass No. | 11 | 12 | 13 | 14 | 15 | 16 | 17 | 18 | 19 |
|---|---|---|---|---|---|---|---|---|---|
| Wt% | | | | | | | | | |
| $SiO_2$ | 54.4 | 54.2 | 54.7 | 55.3 | 55.8 | 56.3 | 56.5 | 53.1 | 52.8 |
| $B_2O_3$ | 22.5 | 22.5 | 22.6 | 22.9 | 23.1 | 23.3 | 23.3 | 22.0 | 21.9 |
| $Al_2O_3$ | 8.7 | 9.7 | 8.8 | 8.8 | 8.9 | 9.0 | 9.0 | 8.5 | 8.4 |
| $P_2O_5$ | | | | | | | | | |
| MgO | 1.1 | | 1.11 | 1.12 | 1.13 | 1.14 | 1.15 | 1.07 | 1.07 |
| $Li_2O$ | | | | | 0.91 | 0.91 | | | 1.81 |
| $Na_2O$ | | | 0.1 | 2.0 | 0.1 | 2.0 | | | 3.9 |
| $K_2O$ | 12.6 | 11.2 | 12.7 | 10.0 | 10.1 | 7.3 | 10.0 | 15.3 | 10.1 |
| PbO | | | | | | | | | |
| $ZrO_2$ | | 2.0 | | | | | | | |
| $TiO_2$ | | | | | | | | | |
| $Ag_2O$ | .35 | .14 | .14 | .14 | .14 | .12 | .16 | .15 | .25 |
| CuO | .008 | .016 | .004 | .007 | .017 | .006 | .010 | .008 | .013 |
| Cl | .08 | .08 | .05 | .06 | .09 | .09 | .07 | .06 | .13 |
| Br | .20 | .09 | .16 | .21 | .19 | .35 | .21 | .16 | .43 |
| F | | | | | | | | | |
| ODd | .468 | .049 | .322 | .078 | .079 | .048 | .078 | .453 | .287 |
| ½FT (in secs) | 15 | 5 | 19 | 2.5 | 1 | 1 | 1 | 41 | 45 |
| $n_D$ | 1.487 | 1.490 | 1.484 | 1.486 | 1.487 | 1.488 | 1.479 | 1.490 | 1.506 |
| HT° C | 640 | 600 | 705 | 675 | 660 | 660 | 675 | 705 | 620 |
| Time (hrs) | 1 | 1 | 1 | 1 | 1 | 1 | 1 | 1 | 1 |

| Glass No. | 20 | 21 | 22 | 23 | 24 | 25 | 26 | 27 | 28 | 29 |
|---|---|---|---|---|---|---|---|---|---|---|
| Wt% | | | | | | | | | | |
| $SiO_2$ | 53.7 | 55.8 | 55.3 | 56.9 | 58.7 | 54.3 | 53.4 | 52.4 | 40.5 | 31.8 |
| $B_2O_3$ | 22.2 | 23.1 | 22.8 | 23.5 | 24.3 | 22.5 | 22.1 | 21.7 | 24.8 | 26.1 |
| $Al_2O_3$ | 8.6 | 8.9 | 8.8 | 9.1 | 9.4 | 8.7 | 8.5 | 8.4 | 13.7 | 16.8 |
| $P_2O_5$ | | | | | | | | | 5.8 | 9.3 |
| MgO | 1.09 | 1.13 | 1.11 | 1.15 | 1.19 | 1.10 | 1.08 | 1.06 | 1.23 | 1.3 |
| $Li_2O$ | 2.32 | 0.90 | .89 | 1.38 | 2.9 | .88 | .87 | .85 | | |
| $Na_2O$ | 4.8 | 1.98 | 1.96 | 2.0 | 2.1 | 1.93 | 1.89 | 1.86 | .11 | 0.1 |
| $K_2O$ | 7.3 | 7.20 | 5.72 | 5.9 | 1.6 | 7.01 | 6.9 | 6.8 | 13.9 | 14.6 |
| PbO | | 1.02 | 3.35 | | | | | | | |
| $ZrO_2$ | | | | | | 3.63 | 5.35 | 7.01 | | |
| $TiO_2$ | | | | | | | | | | |
| $Ag_2O$ | .25 | .26 | .16 | .20 | .24 | .12 | .09 | .08 | .22 | .25 |
| CuO | .006 | .008 | .008 | .007 | .006 | .006 | .07 | .24 | .007 | .10 |
| Cl | .12 | .08 | .07 | .08 | .10 | .04 | .07 | .27 | .10 | .12 |
| Br | .46 | .15 | .12 | .24 | .26 | .24 | .27 | .22 | .27 | .35 |
| F | | | | | | | | | | |
| ODd | .183 | .489 | .071 | .053 | .033 | .168 | .204 | .074 | .237 | .267 |

| ½ FT (in secs) | 23 | 60 | 3 | 2 | 1 | 2.5 | 3 | 1.5 | 7 | 5 |
|---|---|---|---|---|---|---|---|---|---|---|
| $n_D$ | 1.507 | 1.490 | 1.498 | 1.495 | 1.501 | 1.496 | 1.500 | 1.505 | 1.484 | |
| HT° C | 655 | 680 | 660 | 600 | 695 | 670 | 670 | 670 | 650 | |
| Time (hrs) | 1 | 1 | 1 | 1 | 1 | 1 | 1 | 1 | ½ | |

The compositions listed in the table can be made up in the following manner. The batch is melted under oxidising or neutral conditions at a temperature in the range 1200° to 1600° C, and after cooling is annealed at a temperature between 450° and 650° C. A final heat treatment may subsequently be effected at between 20° and 100° C above the annealing point for a period of 10 to 60 minutes. The optimum heat treatment temperature range for a particular glass may be determined by a gradient furnace technique. In some cases, it may be necessary to support the glass during heat treatment to avoid sagging.

Precautions are required during melting to minimise volatilisation losses or batch components. Up to 60% by weight of the halide components and 30% by weight of the silver may be lost in this way and the necessary allowances are required during bath preparation.

The glasses have a useful combination of photochromic effect, measured as induced optical density, with speed of response to exposure to, or removal of, actinic radiation. Although in some glasses it will be seen that the induced optical density is not high, the speed of response in those glasses is particularly rapid.

The glasses can be used for ophthalmic purposes and for other applications where temporary protection from actinic radiation, such as sunlight, is required with a return to normal transmission when the actinic radiation is absent. They may thus be used for glazing in buildings or vehicles in some circumstances.

We claim:

1. A photochromic boro-silicate glass having a half fading time of not more than 60 seconds which has silver halide crystals dispersed throughout the glass, and which is free from barium, consisting essentially of, in weight percentages:

| | |
|---|---|
| $SiO_2$ | 31 to 59% |
| $B_2O_3$ | 18 to 28% |
| $Al_2O_3$ | 8 to 20% |
| $R_2O$ | 6 to 16% |
| MgO | 0 to 2.6% |
| $P_2O_5$ | 0 to 12% |
| $ZrO_2$ | 0 to 7% |
| $TiO_2$ | 0 to 5% |
| PbO | 0 to 7% | where $R_2O$ represents one or more of $Li_2O$, $Na_2O$ and $K_2O$ in amounts within the ranges 0 to 3% $Li_2O$, 0 to 8% $Na_2O$ and 0 to 16% $K_2O$, and, in weight percentages expressed as quantities over and above the 100% total of all the other components:

| | |
|---|---|
| silver, expressed as $Ag_2O$ | 0.05 to 4% |
| halide | 0.13 to 1% |
| CuO | 0 to 1%. |

2. A glass according to claim 1, wherein the content of silver, expressed as $Ag_2O$, is from 0.08 to 0.39% by weight.

3. A glass according to claim 1, wherein the halide content is made up of one or more of Cl, Br and F in amounts within the ranges 0.04 to 0.5% Cl, 0 to 1.0% Br and 0 to 0.2% F.

4. A glass according to claim 1, wherein the amount of CuO is 0.004 to 1%.

* * * * *